(No Model.)
R. WHERRY.
COMBINED MILK AERATOR AND COOLER.
No. 467,965. Patented Feb. 2, 1892.
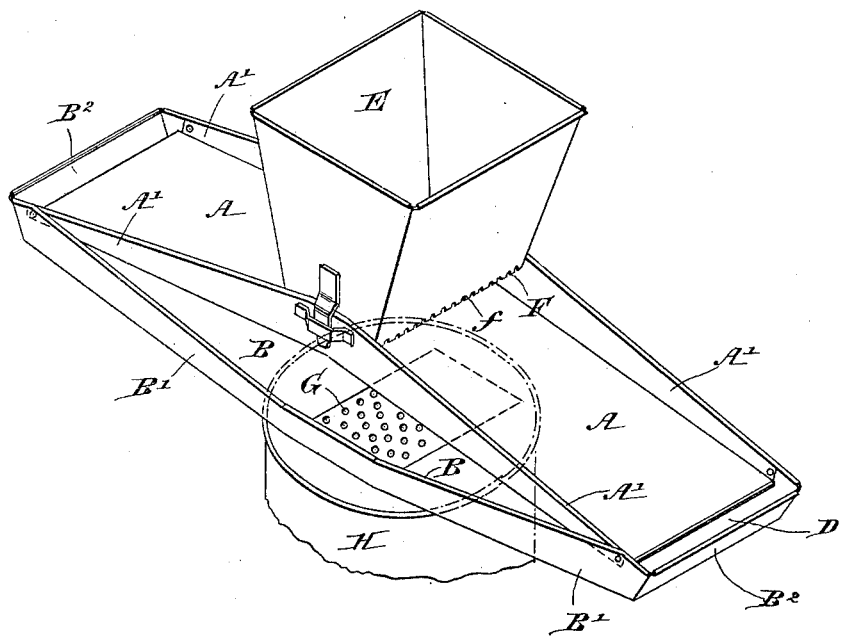
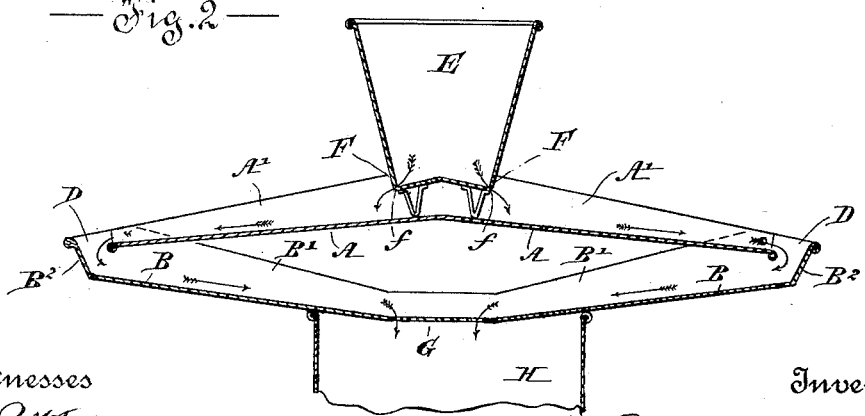

United States Patent Office.

ROBERT WHERRY, OF IROQUOIS, CANADA.

COMBINED MILK AERATOR AND COOLER.

SPECIFICATION forming part of Letters Patent No. 467,965, dated February 2, 1892.

Application filed March 5, 1891. Serial No. 383,844. (No model.) Patented in Canada February 2, 1891, No. 35,933.

*To all whom it may concern:*

Be it known that I, ROBERT WHERRY, of Iroquois, in the county of Dundas and Province of Ontario, Canada, have invented certain new and useful Improvements in Combined Milk Aerators and Coolers, (for which I have obtained Letters Patent in Canada, No. 35,933, dated February 2, 1891;) and I do hereby declare that the following is a full, clear, and exact description of the same.

This invention relates to the devices used by cheese and butter makers for aerating and cooling freshly-drawn milk and to abstract from it the animal heat and odors contained therein, its object being to produce a device the construction of which will be more simple and cost less than those hitherto used and besides secure improved results in the way of a more extensive exposure of the milk to the air, although protected from any gusts of wind that might occur, and it is adapted to milk cans or receptacles of varying sizes.

It consists in an arrangement of upper oblong chutes inclining downwardly outward in opposite directions, a perforated receptacle located at the apex of such chutes, and lower oblong flanged chutes inclining downwardly inward from beyond the outer open ends of and beneath the inclined upper chutes and forming at the central part a perforated junction, the flanges of the lower chutes being of such form as to leave a central open space on each side of the aerator for the circulation of air.

For full comprehension, however, of the invention reference must be had to the annexed drawings, in which like symbols indicate corresponding parts, and wherein—

Figure 1 is a perspective view of my combined aerator and cooler in place on a milk-can, and Fig. 2 a longitudinal vertical section of same.

A A and B are oblong chutes inclined, preferably, at about an angle of twenty degrees, those A A sloping from a central point of junction downwardly outward and those B B downwardly inward from beneath the outer ends of the former, beyond which they project somewhat. Side strips or flanges A' A' B' B' and end pieces B² B² on the respective chutes act as shields from any gusts of wind that might tend to blow the milk off the chutes, and it is to the side strips B' B' that the outer ends of the chutes A A are connected, so as to leave a passage or opening D between such ends and the chutes B B for the milk to pass through. A receptacle E, removable or fixed, as may be desired, into which the milk is first poured, is situated centrally above the chutes A A, and has its bottom inclined longitudinally from its center to the transverse sides, so that all the milk will drain through a line of perforations $f$ in each of the extreme bottom corners or edges F F onto the chutes A A. Any suitable strainer can be placed on top of the receptacle E. Perforations G are made centrally of the chutes B B to allow the milk to pass through same to the milk-can H, on which the device rests.

It will be seen that the inclined oblong bottom chutes of my device secures the following advantages, viz: The possibility of setting it in place on milk cans or pails of any diameter or size ranging from twelve inches, the usual width of the aerator, to thirty-six inches, the usual length thereof, without any degree of care being required in its adjustment; secondly, the possibility of any sluggishness of the stream occurring, as would be the case if the bottom were horizontal, is avoided and the operation generally greatly accelerated.

What I claim is as follows:

A milk aerator and cooler formed of upper oblong chutes inclining downwardly outward in opposite directions, a perforated receptacle located at the apex of such chutes, and lower oblong flanged chutes inclining downwardly inward from beyond the outer open ends of and beneath the inclined upper chutes and forming at the central part a perforated junction, the flanges of the lower chutes being of such form as to leave a central open space on each side of the aerator for the circulation of air.

ROBERT WHERRY.

Witnesses:
A. E. OVERELL,
EDWIN G. P. SICKEL.